United States Patent [19]

Matheson et al.

[11] Patent Number: 4,740,487

[45] Date of Patent: Apr. 26, 1988

[54] COMPOSITE CATALYST OF RUTHENIUM OF ZEOLITE AND A GROUP VI AND/OR GROUP VIII METAL ON REFRACTORY

[75] Inventors: Trevor W. Matheson, Wellington, New Zealand; Kerry C. Pratt, Ringwood, Australia; Timothy G. Harvey, North Carlton; Mark S. Stanborough, West Hobart, all of Australia

[73] Assignee: Commonwealth Scientific and Industrial Research Organization, Australia

[21] Appl. No.: 878,890

[22] PCT Filed: Sep. 9, 1985

[86] PCT No.: PCT/AU85/00221

§ 371 Date: Jun. 11, 1986

§ 102(e) Date: Jun. 11, 1986

[87] PCT Pub. No.: WO86/01743

PCT Pub. Date: Mar. 27, 1986

[30] Foreign Application Priority Data

Sep. 12, 1984 [AU] Australia ............... PG7082/84

[51] Int. Cl.$^4$ ............... B01J 29/12; B01J 29/22

[52] U.S. Cl. ............... 502/66; 502/74
[58] Field of Search ............... 502/66, 74

[56] References Cited

U.S. PATENT DOCUMENTS

| | | | |
|---|---|---|---|
| 3,197,398 | 7/1965 | Young | 502/66 |
| 3,617,509 | 11/1971 | Hensley, Jr. | 502/66 |
| 3,709,814 | 1/1973 | Jaffe | 502/66 |
| 3,963,788 | 6/1976 | Kruse et al. | 502/66 |
| 4,148,759 | 4/1979 | Hilfman | 502/66 |
| 4,350,615 | 9/1982 | Meguerian et al. | 502/66 |

FOREIGN PATENT DOCUMENTS 23481  2/1985  Japan ............... 502/66

*Primary Examiner*—Carl F. Dees
*Attorney, Agent, or Firm*—Sughrue, Mion, Zinn, Macpeak & Seas

[57] ABSTRACT

A novel catalyst composition comprising ruthenium or a ruthenium containing material together with a zeolite support material and a refractory support impregnated with a Group VI or Group VIII metal or a combination of such metals and a method of preparing the catalyst composition.

22 Claims, 3 Drawing Sheets

Simulated distillations of products of continuous processing of Dravo shale oil over various catalysts. (A)-the raw oil; (B)-over BASF M8-21 6 h on stream, SV=1.0h$^{-1}$; (C)-over MS-83 6 h on stream, SV=1.0h$^{-1}$; (d)-over MS-83 2 h on stream, SV=1.0h$^{-1}$; (E)-over MS-83 12 h on stream, SV=0.6h$^{-1}$.
Temperature = 450°C; Pressure = 13.8 MPa.

COMPOSITE CATALYST OF RUTHENIUM OF ZEOLITE AND A GROUP VI AND/OR GROUP VIII METAL ON REFRACTORY

The present invention relates to catalyst materials containing a transition metal and a support material, to methods of making the catalysts and to processes for using the catalysts to produce useful fuel materials. In particular, the present invention relates to catalysts having ruthenium supported on a zeolite material, preferably an acidic material in combination with a Group VI or Group VIII metal on a refractory support, and to the use of the catalysts in treating hydrogen and carbon-containing material to produce a fuel material.

Although the present invention will be described with particular reference to treating shale oil to produce transport fuel and in particular middle distillate fuel, it is to be noted that the present invention is not so limited and is applicable to a variety of high-boiling feeds and processes.

One disadvantage of using alternative sources of fuel to, or substitute liquid fuels for, petroleum crude oil stocks, such as for example, using heavier fractions of crude oil, shale oil, coal and tar sands to derive the fuel, is that the product oils obtained from the alternatives can contain high levels of nitrogen, oxygen and sulphur. All of the high-boiling feed stocks concentrate heavy metal impurities, heterocyclic nitrogen, sulphur, and oxygen compounds and large polynuclear molecules. Nitrogen compounds are poisons to reforming and cracking catalysts, the combustion of sulphur- and nitrogen-containing material increases deleterious oxide emissions, and the presence of oxygen and nitrogen compounds in the final product causes poor storage stability. Therefore, in order to use these product oils as fuels or feedstock the amount of heteroatoms, in particular nitrogen, present in the product oils must be reduced. A commonly used method of heteroatom reduction is hydrotreatment of the oil using a suitable catalyst in the presence of hydrogen. In essence, the upgrading involves the removal of the organically bound N, S and O, and the breaking down of the high molecular weight components into a material having a desired boiling range. These processes are usually described as hydrodenitrogenation (HDN), hydrodesulphurisation (HDS), hydrodeoxygenation (HDO) and hydrocracking respectively.

Catalytic hydrotreating consists of the removal by hydrogenolysis of sulphur, oxygen and nitrogen as $H_2S$, $H_2O$ and $NH_3$, respectively, leaving heteroatom-free hydrocarbons. In addition some hydrocracking can occur, depending on the catalyst used. The conventional catalysts are based on transition metal sulphides and have been developed into relatively sophisticated systems by the petroleum industry. The catalysts normally employed are cobalt- and nickel-promoted molybdenum or tungsten supported on alumina or silica-alumina; the application of crystalline molecular sieve zeolites to catalytic hydrotreating has only recently attracted attention.

The production of middle distillates from heavy or "dirty" feedstock using conventional catalysts usually requires a two-stage process; one stage for the production of a suitable crude material and the other stage for the production of a useful fuel product. The present invention in one form is directed to a new catalyst system which is capable of simultaneously hydrotreating and hydrocracking heavy feeds for the direct production of middle distillates under commercially acceptable conditions.

The current generation of hydrocracking catalysts are bifunctional and provide both a hydrogenating and a cracking function. The hydrogenating component is normally provided by the noble metals, particularly palladium and platinum, except when the feed heteroatom content is high. In such circumstances, or in a two-stage process, the initial hydrotreating step usually employs sulphides of Group VI metals or of Group VI and Group VIII metal combinations; especially molybdenum or tungsten with cobalt or nickel to remove nitrogen and sulphur prior to the actual cracking of the feed stock which if not removed would poison the noble metal catalysts as indicated earlier. The cracking function is provided by an acidic component. Traditionally this has been supplied by amorphous metal oxides such as alumina, silica-alumina and silica-magnesia; and by specifically developed supports which include oxides of chromium, titanium and zirconium. More recently, zeolite supports have become important in hydrocracking and provide shape-size selectivity as well as acidic sites. Zeolite supports are normally used in admixture with amorphous metal oxides; the catalytic metals can be added to the mixed support or preferentially to one or all of the support components. As the hydrotreating and hydrocracking are high temperature high pressure processes, the cost of providing two separate vessels is considerable. Thus, the development of a highly active hydrocracking catalyst, which is S- and N-tolerant would be a very significant advance.

Ruthenium and its compounds have application in both heterogeneous and homogeneous catalysts. Uses of ruthenium metal on refractory inorganic oxide supports include methanation, Fischer-Tropsch synthesis of hydrocarbons and steam reformation of methane. However, the potential of supported ruthenium as a catalyst for hydrotreating or hydrocracking has not been investigated, nor has the use of ruthenium and ruthenium containing compounds supported on zeolite in combination with refractory metal containing supports and other catalytic metal components been investigated or even considered up until the studies leading to the present invention.

Therefore, it is an aim of the present invention to provide a catalyst material containing ruthenium in combination with a support material which at least alleviates some of the problems of previously used catalysts, particularly problems involving poisoning of such catalysts by feed materials having a high heteroatom content.

According to one aspect of the present invention there is provided a catalyst material comprising ruthenium or a ruthenium containing material or a combination thereof with a zeolite support and a Group VI or Group VIII metal or a Group VI or Group VII metal containing material or a combination thereof with a refractory support material.

Typically, the zeolite material is a sodium containing zeolite in which at least a portion of the sodium content has been exchanged with or replaced by ammonium ion or ammonium-ion containing material.

Typically, the Group VI or VIII metal comprises one or more of cobalt, molybdenum, tungsten and/or nickel.

Typically, at least a portion of the ammonium-ion-containing material has been replaced by ruthenium.

Typically, the zeolite material is in its acid form in the catalyst composition. Typically, the acid form is formed by exchanging the ammonium ion by hydrogen ion.

A typically active form of the catalyst material contains a ternary material combination. Preferred ternary metal compositions are ruthenium, molybdenum and nickel; ruthenium, molybdenum and cobalt; ruthenium, tungsten and nickel; and ruthenium, tungsten and cobalt.

Typically, the refractory support is an inorganic oxide, such as for example alumina, titania, zirconia, magnesia, silica, silica-alumina, natural or synthetic clays or the like including combinations of one or more thereof.

Typically, the metal combinations, including the ternary combinations, are supported on a mixture of gamma-alumina and Y-zeolite. Typically the ratio of Y-zeolite to gamma-alumina is in the range 1:9 to 9:1, more typically 1:4 to 4:1, preferably 1:1.

Typically, ruthenium is present in the catalyst composition in an amount from about 0.01 to 20% w/w of the zeolite, more typically, from about 0.5 to 3% w/w, preferably about 1% w/w of the zeolite.

The group VIII metal is typically present as the oxide, such as $NiO_3$ and is typically present in about 2 to 10%, more typically 3 to 8%, preferably about 5%.

Typically, the Group VI metal is present as the oxide, such as $MoO_3$ in an amount from 5 to 30% w/w, more typically 10 to 20%, preferably about 15%. Typically, the ratio of the Group VIII metal oxide to Group VI metal oxide is in the range 1:1 to 1:5, more particularly 1:3.

Typically ruthenium is present in about 0.01 to 20%, more typically 0.5 to 3% w/w of zeolite, and $NiO_3$ and $MoO_3$ are present in about 5% w/w and 15% w/w of the weight of alumina, respectively. Preferably, there is about 1% ruthenium by weight based upon the weight of zeolite or about 0.5% ruthenium by weight based on the total weight of the catalyst in the case where there is about 50% by weight of zeolite and alumina in the catalyst composition.

Typically the ruthenium containing material is soluble in water. More typically, the ruthenium containing material is a ruthenium complex such as for example a ruthenium hexamine complex $[Ru(NH_3)_6]^{3+}$, $[RuCl_3 \cdot xH_2O]$, and $[Ru_3(CO)_{12}]$.

Typically the catalyst material comprises a mixture of $Ru/NH_4$ zeolite and $Ni-Mo/Al_2O_3$.

Typically, the preferred form of the catalyst will comprise from 0.5% w/w to 20% w/w Ru in the $NH_4$ zeolite, and from 0 to 15% w/w NiO and 0 to 40% $MoO_3$ in the alumina. The ratio of the zeolite to alumina will typically be between 1:9 to 9:1, more typically 1:4 to 4:1, preferably 1:1.

According to another aspect of the present invention there is provided a method of making a catalyst material comprising reacting a zeolite material with an ammonium containing material at a temperature between about 10° to 200° C. to produce an ammonium exchanged zeolite material, reacting the ammonium-containing zeolite material with a ruthenium-containing compound in aqueous solution either directly or after further treatment under stirring to produce a ruthenium-containing zeolite material and contacting the ruthenium-containing zeolite material with a refractory material containing a Group VI or Group VIII metal or combination thereof so as to form a ruthenium-containing catalyst material.

Preferably, the ruthenium containing zeolite is reacted or used with a gamma-alumina support material, preferably containing Ni and Mo. Typically, the reactions are conducted at about room temperature.

Typically, the ruthenium —$NH_4$ Y zeolite component was prepared in accordance with the methods of the present invention. In the preparation of the Ni-Mo/alumina component, gamma-alumina (such as for example, supplied by Norton, with surface area 190 $m^2/g$) was impregnated in aqueous solution with a solution of nickel nitrate and ammonium molybdate, followed by drying and calcining to produce a catalyst containing 5% w/w NiO and 15% w/w $MoO_3$ on alumina. In making the mixed system, both components were combined in the desired proportions with suitable binders and lubricants, and fabricated into catalyst units of about 3 mm diameter.

Typically the zeolite to alumina ratio is substantially about 1:1.

According to another aspect of the present invention there is provided a method of treating a hydrogen and carbon-containing feed material, typically a shale-oil or heavy crude oil, comprising reacting the feed material with a catalyst material comprising the combination of a ruthenium-containing acidic zeolite material and a refractory support material having a Group VI or Group VIII metal or combination thereof at a temperature from 50° C. to 500° C. at a pressure of 0–4000 psi so as to convert the feed material into a useful fuel product.

The present invention will now be more fully described with reference to the following examples and accompanying drawings in which.

MODEL COMPOUND STUDIES

Figure 1:
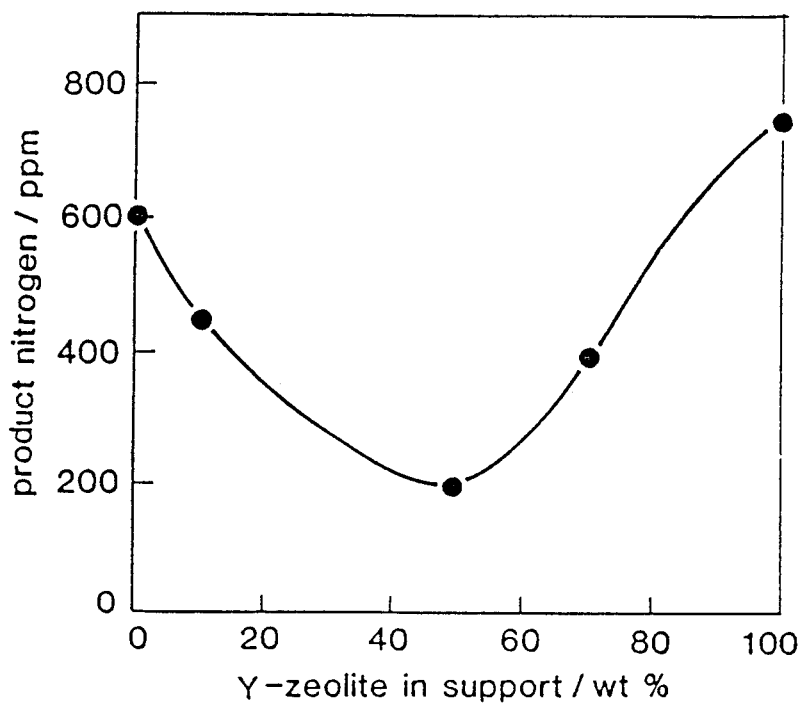
FIG. 1 illustrates the effect of the zeolite/alumina ratio on the nitrogen removal ability of a ruthenium based catalyst according to the present invention.

Since quinoline-type compounds are known to be major components of high-nitrogen content feedstocks, the hydrodenitrogenation(HDN) of quinoline was used as a model system to establish the optimum combination of metal, support and method of impregnation. Therefore, a variety of materials containing ruthenium was tested to determine the best catalyst formulations. The ruthenium precursor materials —$[RuCl_3 \cdot xH_2O]$, $[Ru_3(CO)_{12}]$, and $[Ru(NH_3)_6]^{3+}$—were added to two supports, amorphous gamma-alumina and the crystalline molecular sieve Y-zeolite, and tested for their catalytic activity using an autoclave operating in the batch mode. The best catalyst was then further tested for its activity in the upgrading a high nitrogen-content shale oil. The activities of the prepared catalysts were also compared with those of commercial formulations operating under the same experimental conditions.

A Typical Catalyst Preparation

A Na-Y zeolite, preferably an ultra stable form, was stirred overnight twice with 1M $NH_4Cl$, washed chloride free, then oven dried at 80°–100° C. to give $NH_4$-Y.

A gamma-alumina support (such as for example supplied by Merck), had a surface area (BET method) of 124 $m^2g^{-1}$ and was used as received.

The $NH_4$-Y and gamma-$Al_2O_3$ supported catalysts were prepared by stirring aqueous solutions (0.5 liter of 0.002M) of $[Ru(NH_3)_6]^{3+}$ and $[RuCl_3.xH_2O]$ with the support (2 g) overnight. The resulting solids were then air-dried, preferably between 10° and 150° C., more preferably room temperature. The $[Ru_3(CO)_{12}]$-based catalysts were prepared by impregnating the support (2 g) with a solution of the carbonyl (0.211 g) in benzene then stirring overnight under an atmosphere of nitrogen. The solvent was evaporated in a stream of nitrogen. Catalyst samples were sulphided before use by heating a heptane slurry at 350° C. for three hours in the presence of sulphur (introduced as a $H_2/H_2S$ mixture, or $H_2/CS_2$).

The composition of the prepared catalysts is shown in Table 1. The formulation of the commercial catalyst BASF M8-12 is given in Table 3.

TABLE 1

| COMPOSITION OF CATALYSTS | | | |
| --- | --- | --- | --- |
| Catalyst Precursor | Support | Designation | Metal, wt. % |
| $[Ru(NH_3)_6]^{3+}$ | Y-zeolite | RuNY | 3.33 |
| $[Ru_3(CO)_{12}]$ | Y-zeolite | Ru(CO)Y | 2.30 |
| $[RuCl_3.xH_2O]$ | Y-zeolite | RuClY | 5.17 |
| $[Ru(NH_3)_6]^{3+}$ | gamma-$Al_2O_3$ | RuN | 3.99 |
| $[Ru_3(CO)_{12}]$ | gamma-$Al_2O_3$ | Ru(CO) | 4.86 |
| $[RuCl_3.xH_2O]$ | gamma-$Al_2O_3$ | RuCl | 4.29 |

Catalyst Testing

Quinoline hydrodenitrogenation (HDN) experiments were carried out in a 70 $cm^3$ autoclave (Parr Model 4742), operated in the batch mode. The autoclave was loaded with the reactants in a glass liner (quinoline (1 g); catalyst (0.100 g); $CS_2$ (0.030 g), in a slurry with n-heptane (15 ml) as carrier. Carbon disulphide was added to maintain the catalyst in the sulphided state.

The autoclave was flushed with nitrogen, cold filled at 3448 kPa hydrogen pressure then heated, with stirring, to the required temperature (350° or 400° C.). At these temperatures the pressures were approximately 6600 kPa and 10300 kPa, respectively. After reaction, the autoclave was cooled, flushed with nitrogen and the contents analysed. Total time from switch on to switch off was five hours. The reaction products and conversions found for the various catalysts tested are presented in Table 2.

(a) gamma-Alumina-Supported Catalysts

The traditional carrier for hydroprocessing catalysts is an amorphous solid such as alumina or silica-alumina. Catalytically active metals are usually placed in these acidic supports by impregnation with a solution of a metal salt or a combination of metal salts. Impregnation via low-valent organometallic precursors also provides active catalysts. In this study both methods were used to disperse ruthenium on gamma-alumina. Of the catalysts, only RuN (Table 1) did not show good Ru dispersion. The XRD (X-ray diffraction) of RuN showed some bulk ruthenium sulphide, and this was confirmed by the observation of crystalline clumps in the transmission electron micrographs. These catalysts gave products similar to those for the zeolite-based catalysts. At 350° C. quinoline conversion was high, but the product was almost exclusively 1,2,3,4-tetrahydroquinoline. At 400° C. some C-N bond cleavage occurred, but the alumina-based catalysts proved less active than the zeolite catalysts and the commercial catalyst.

(b) Zeolite-Supported Catalysts

Transition metals are generally introduced into zeolites by cation exchange or by adsorption of low valent organometallic complexes. The readily available ruthenium sources are $[RuCl_3.xH_2O]$, $[Ru(NH_3)_6]^{3+}$ and $[Ru_3(CO)_{12}]$. Ruthenium ion exchange into zeolites is considered to be more suitably carried out using $[Ru(NH_3)_6]^{3+}$ than $[RuCl_3.xH_2O]$. In the present work all the ruthenium compounds have been introduced into the $NH_4^+$ form of Y-zeolite. Under test conditions the residual $NH_4^+$ ions decompose to give the proton form of Y-zeolite.

TABLE 2

| PRODUCTS OF HDN OF QUINOLINE OVER RUTHENIUM CATALYSTS | | | | | | | | | | | | | | |
| --- | --- | --- | --- | --- | --- | --- | --- | --- | --- | --- | --- | --- | --- | --- |
| | Catalyst | | | | | | | | | | | | | |
| | BASF M8-21 | | RuNY | | Ru(CO)Y | | RuClY | | RuNγ | | Ru(CO)γ | | RuClγ | | RuNY + BASF M8-21 |
| Temp. °C. | 350° | 400° | 350° | 400° | 350° | 400° | 350° | 400° | 350° | 400° | 350° | 400° | 350° | 400° | 400° |
| % Conversion | 86 | 91 | 88 | 91 | 92 | 88 | 90 | 87 | 95 | 81 | 93 | 77 | 91 | 81 | 96 |
| % Propyl cyclohexane | 3.3 | 3.7 | — | 1.6 | — | 2.7 | — | 1.2 | — | 1.2 | — | 1.2 | — | 1.1 | 5.9 |
| % Propyl benzene | 0.3 | 1.2 | — | 3.3 | — | 1.4 | — | 1.2 | — | 1.2 | — | — | — | 1.1 | 19.1 |
| % 5-6-7-8 Tetrahydro quinoline | 5.6 | 22.2 | 16.2 | 36.1 | 1.5 | 21.9 | 1.1 | 22.9 | 1.2 | 14.8 | 4.8 | 14.5 | 3.8 | 14.9 | 23.5 |
| % Propyl Aniline | 11.2 | 38.3 | — | 8.2 | — | 16.4 | — | 20.5 | — | 12.3 | 4.1 | 3.6 | — | 16.1 | 20.6 |
| % 1-2-3-4 Tetrahydro quinoline | 64.7 | 17.3 | 69.8 | 27.9 | 87.7 | 37.0 | 89.7 | 30.1 | 92.9 | 43.2 | 82.6 | 48.2 | 86.1 | 40.2 | 17.6 |
| % HC's $C_3$-$C_5$ | 0.3 | 7.3 | 0.2 | 9.5 | — | 5.5 | 0.1 | 8.3 | — | 5.7 | 0.1 | 6.7 | — | 4.1 | 7.4 |

Table 2 shows that at 350° C. the zeolite-based catalysts are not as active as the commercial catalyst. Quinoline conversions are high but the products are mainly hydrogenated quinolines; no C-N bond-scission has occurred. At 400° C. there are increased amounts of the product of hydrogenation of the non-heterocyclic ring of quinoline, the products of C-N bond-breaking, i.e. propylaniline and non-nitrogen containing compounds, are produced in quantities similar to those obtained with the commercial catalyst.

RuNY, in particular, compared very favourably with the commercial catalyst in its conversion of quinoline and its C-N bond-breaking ability, but the other zeolite catalysts were also highly active. The activity tests were carried out at low nitrogen-removal levels. Under more forcing conditions (450° C., 13800 kPa) RuNY gave non-nitrogen containing material in excess of 70%, compared with around 60% for the commercial catalyst. The zeolite supported catalysts showed high activity for quinoline-HDN at much lower metal loadings (i.e. 5 wt. %) than those of commercial catalysts. The reference catalyst, BASF M8-21, reputedly contains approximately 10% Mo and 3% Ni which are typical loadings in most commercial catalysts so the activity of the ruthenium catalysts per mole of metal is far superior to the commercial formulations.

(c) Multimetallic/Mixed Support Systems

A 1:1 combination of ruthenium on Y-zeolite with the commercial Ni/Mo on gamma-alumina catalyst was extremely active for the HDN of quinoline (Table 2) more so than either of the component catalysts. The synergistic effect obtained from the ternary metal-/alumina-zeolite system evident in the model compound study was confirmed in shale oil tests.

Since the present invention is, in one form, directed to the hydrotreatment or hydrocracking of feed material derived from natural sources having heteroatoms, such as nitrogen, a study was performed in the laboratory on shale oil in order to investigate aspects of the present invention.

The Optimum Zeolite-to-Alumina Ratio

A series of autoclave tests was performed to examine the effect of the ratio of Y-zeolite to alumina in the catalyst. Each catalyst was firstly prepared in pelleted form (see above). For these experiments, the pellets were crushed and sieved, and the size fraction between 60–100 mesh selected.

Autoclave tests were carried out in a 300 cm$^3$ stirred autoclave (Autoclave Engineers). All catalysts were sulphided before use. The autoclave was charged to a pressure of 0.52 MPa (cold) with a mixture of 20% v/v H$_2$S in H$_2$, and heated to 400° C. for 4 hours. For the tests, 50 g of the shale-oil, and 1 g of the sulphided catalyst were placed in a glass liner in the autoclave, which was filled with hydrogen to 10.3 MPa cold pressure. No additional sulphur was added. The autoclave was then heated to 400° C. Heating time was 12 hours from switch-on to switch-off. After cooling the autoclave contents were removed for analysis.

The results of these tests are shown in FIG. 1.

It is clear that an optimum zeolite-to-alumina ratio exists at about 1.0. These results suggest that the two components (Ru-zeolite and Ni-Mo-alumina) are acting synergestically, and that the alumina is not acting simply as a diluent.

Boiling Range Reduction

Figure 2:
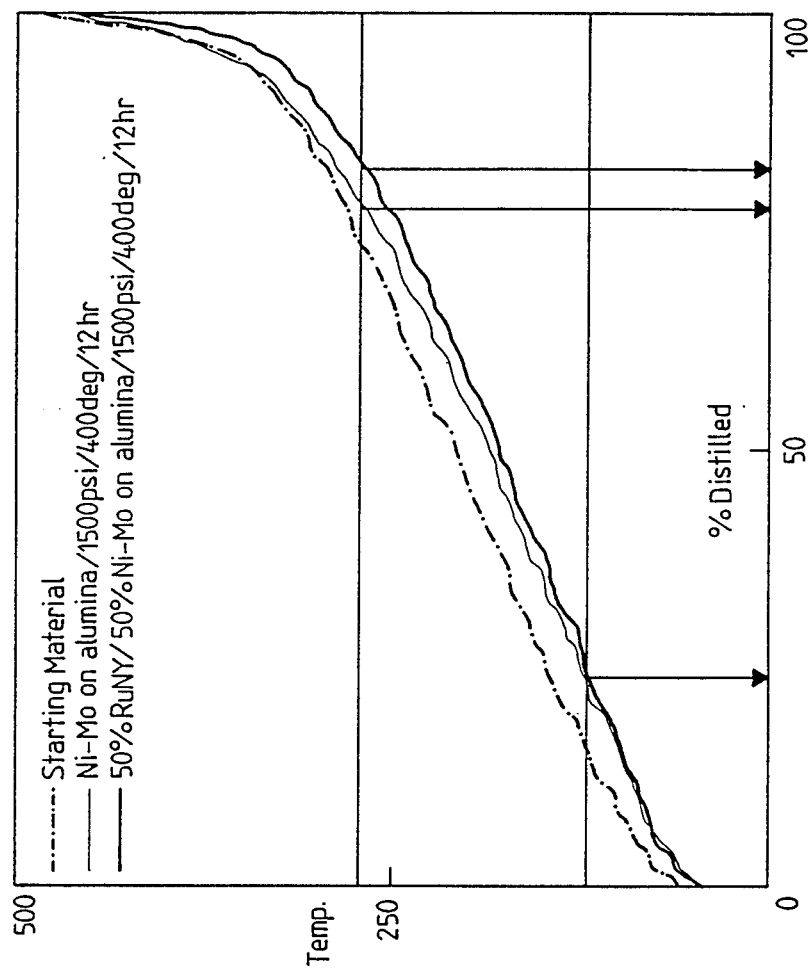
FIG. 2 illustrates the comparison of the boiling ranges of products produced by a reference catalyst and a catalyst of the present invention.

Hydrocracking is an important part of the upgrading process in which the boiling range of the product oil is lowered, thereby increasing the yield of material in the middle distillate range. The boiling point ranges of the products in this work have been measured using a simulated distillation technique. In order to evaluate the effectiveness of the various catalysts we have compared the boiling ranges of the products from the autoclave runs described above. The lowest product boiling range was produced by the catalyst containing a 1:1 zeolite/alumina ratio. The boiling range of this product, and that produced by the reference catalyst, the commercial Ni-Mo system, are compared in FIG. 2. It is apparent that the ruthenium-based system results in a product whose boiling point is about 15° C. below that of the Ni-Mo product in the upper boiling region. Using a boiling range of 120°–270° C. (approximating to the JP-4 jet fuel specification) gives a JP-4 boiling range yield of 54% for the Ni-Mo catalyst, and 58.6% for the ruthenium-based system. Thus, a significant increase in middle-distillate yield is provided by the use of this catalyst. It is also clear from FIG. 2 that increased yields are only available if the boiling point is reduced in the higher temperature range. Excessive cracking in the region of the lower temperature specification reduces the yield. The ruthenium-based system has cracked selectively in the upper temperature region.

Uses of the catalysts in accordance with the present invention.

Continuous Shale Oil Upgrading With Commercial Catalysts

The results above suggest that the catalyst consisting of a mixture of Ru/NH$_4$ zeolite and Ni-Mo/Al$_2$O$_3$ could have special application in the upgrading of shale oil. In order to assess the efficacy of the ruthenium catalyst it is first necessary to establish the performance level of commercially available hydroprocessing catalyst under continuous flow conditions. In the following section the results of continuous hydrotreatment of shale-oil with some commercial catalysts are described.

Three commercial catalyst systems were chosen for initial evaluation. These catalysts are based on combinations of Ni, Mo and W on an alumina or silica-alumina support. Some properties of the catalysts are shown in Table 3.

TABLE 3

SOME PROPERTIES OF THE COMMERCIAL CATALYSTS EMPLOYED

| Catalyst | Composition % w/w (as supplied) | Surface Area m$^2$g$^{-1}$ | Pore Volume cm$^3$g$^{-1}$ | Average Pore Radius nm |
|---|---|---|---|---|
| Ni—Mo (on Al$_2$O$_3$) | NiO - 3.0 MoO$_3$ - 15.0 | 160 | 0.6 | 7.5 |
| Co—Mo (on Al$_2$O$_3$) | CoO - 5.0 MoO$_3$ - 13.5 | 176 | 0.5 | 5.7 |
| Ni—W (on SiO$_2$/Al$_2$O$_3$) | NiO - 7.6 WO$_3$ - 24.0 | 111 | 0.37 | 6.7 |

The primary measures of catalyst effectiveness have been taken here as the extent of nitrogen removal, and the degree of hydrocracking, indicated by changes in the boiling point range.

The oil used in the work has derived from Rundle shale retorted by the Lurgi-Ruhrgas process. The hydrotreating tests were carried out in the material boiling in the range 100° C.–400° C. The elemental analysis of the feed oil is shown in Table 4.

TABLE 4

| ELEMENTAL ANALYSIS OF FEED OIL MIXTURE | |
|---|---|
| Element | Composition % w/w |
| C | 85.4 |
| H | 11.5 |
| N | 1.1 |
| S | 0.9 |
| O | 0.9 |
| Ash | 0.2 |

Continuous runs were performed in a high-pressure continuous reactor. Catalyst volume is 60 cm$^3$. The reactor is controlled by a microcomputer in a supervisory mode, and is capable of long periods of unattended operation. The catalyst was sulphided before use by passing a stream of gas consisting of 20% v/v H$_2$S in H$_2$ through the reactor for 4 h at 400° C. Some results for continuous processing using conventional catalysts are shown in Table 5.

TABLE 5

CONTINUOUS PROCESSING OF SHALE OIL OVER VARIOUS CATALYSTS
Conditions: pressure = 13.8 MPa, temperature = 400° C., LHSV = 1.0 h$^{-1}$

| Time on stream (h) | Aromatics[a] | | | H/C | | | N (ppm) | | |
|---|---|---|---|---|---|---|---|---|---|
| | Co—Mo | Ni—Mo | Ni—W | Co—Mo | Ni—Mo | Ni—W | Co—Mo | Ni—Mo | Ni—W |
| Feed | 6.2 | — | — | 1.61 | — | — | 10,900 | — | — |
| 2 | 3.2 | 2.4 | 3.9 | 1.90 | 1.93 | 1.88 | 70 | 50 | 70 |
| 4 | — | — | — | — | — | — | 200 | — | — |
| 6 | — | — | — | 1.85 | 1.93 | 1.88 | 200 | 50 | 90 |
| 12 | 3.1 | 2.4 | 3.8 | 1.89 | 1.94 | 1.85 | 200 | 50 | 1600 |
| 24 | — | — | — | 1.86 | 1.92 | 1.85 | 200 | 50 | 4700 |
| 30 | 3.3 | 2.4 | 4.7 | 1.87 | 1.91 | — | 240 | 50 | 9200 |
| 54 | | | | | | 1.84 | | | |

[a]Integrated percent proton NMR signals.

It is clear from the results above that the Ni-Mo system results in the highest degree of nitrogen removal, this catalyst is followed by the Co-Mo, and the least effective is the Ni-W system. Both the Ni-Mo and Co-Mo catalysts appear quite stable over the run time employed, while the Ni-W catalyst deactivated very rapidly. It is apparent that in terms of nitrogen removal the Ni-Mo catalyst is the most suitable commercial system available. However, the remaining nitrogen level is still too high for the direct production of middle distillate. Further, the amount of cracking occurring is quite small. Of the catalysts tested, the Co-Mo system provides the greatest amount of hydrocracking followed by Ni-W and Ni-Mo in that order. However, the differences are marginal. Because of its superior nitrogen removal ability, we chose the commercial Ni-Mo system as reference catalyst, to which prospective new systems can be compared.

Continuous Processing of Shale Oil Over Ruthenium-Based Catalysts

In the tests, the catalyst was loaded into the continuous reactor, and sulphided before use according to the procedure described above for the continuous testing. The results of continuous processing of shale oil over the ruthenium-based catalyst are shown in Table 6.

Table 6 presents results for the continuous hydroprocessing of the 100°–400° C. fraction of Lurgi-retorted shale oil over the commercial BASF M8-21(Ni-Mo) system and the CSIRO MS-83 catalyst of the present invention. The MS-83 catalyst employed in fact consisted of a 40:60 mixture of zeolite:alumina. Thus, superior results would be expected if a 50:50 mixture of zeolite:alumina was used instead of the 40:60 mixture.

TABLE 6

CONTINUOUS PROCESSING OF SHALE OIL OVER THE RUTHENIUM-BASED CATALYST
(100–400° C.)
PRESSURE = 13.8 MPa; TEMPERATURE = 400° C.
SPACE VELOCITY = 1.0 h$^{-1}$

| Time on Stream/h | Product N/ppm | |
|---|---|---|
| | M8-21 | MS-83 |
| Feed | 10,900 | 10,900 |
| 2 | 50 | 1 |
| 4 | — | 1 |
| 6 | 50 | 1 |
| 8 | — | 4 |
| 10 | — | 5 |
| 12 | 50 | 10 |
| 24 | 50 | 45 |
| 30 | 50 | 143 |

The initial HDN activity of the catalyst is much higher than the commercial system (see Table 6 where corresponding values of M8-21 to MS-83 are 50 to 1, but activity begins to decline after some 8 hours on stream. Tests on the used catalyst revealed that the zeolite sieve had lost virtually all crystallinity during operation. Subsequently, an ultra-stable Y-zeolite was employed in catalyst preparation such as is disclosed in the following example.

By way of a second example, results from the processing of a whole Dravo-retorted oil are now provided. This material is much heavier, and is a black solid at room temperature. Preliminary autoclave runs using the comparative commercial catalyst suggested that the processing temperature should be raised to 450° C. to ensure a mobile product. Table 7 details the comparative results of 12 hour continuous runs on the commercial and on the MS-83 catalysts of the present invention.

TABLE 7

CONTINUOUS PROCESSING OF WHOLE DRAVO-RETORTED SHALE OIL
PRESSURE = 13.8 MPa; TEMPERATURE = 450° C.

| BASF M8-21 | | | CSIRO MS-83 | | |
|---|---|---|---|---|---|
| Time on Stream (h) | Space Velocity (h$^{-1}$) | Product N (ppm) | Time on Stream (h) | Space Velocity (h$^{-1}$) | Product N (ppm) |
| Feed | — | 13000 | Feed | — | 13000 |
| 2 | 1.0 | 118 | 2 | 1.0 | 65 |
| 4 | 1.0 | 75 | 4 | 1.0 | 14 |
| 6 | 1.0 | — | 6 | 1.0 | 12 |
| 8 | 0.6 | 35 | 8 | 0.6 | 14 |
| 10 | 0.6 | — | 10 | 0.6 | 24 |
| 12 | 0.6 | 35 | 12 | 0.6 | 25 |

The levels of nitrogen remaining are seen to be considerably lower than the best of the commercial catalysts (the Ni-Mo catalyst). It is clear that the ruthenium-based catalyst is far superior to the commercial Ni-Mo system.

Figure 3:
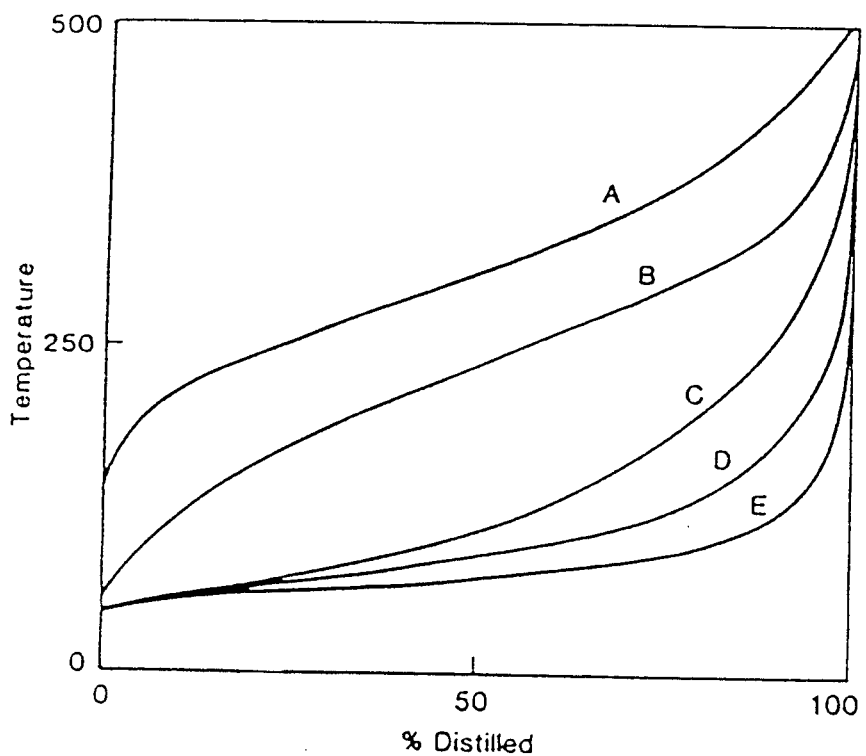
FIG. 3 illustrates the comparison between previously available catalyst materials and the catalyst material of the present invention in processing a sample of shale oil.

The MS-83 catalyst produced a clear, water white liquid of high volatility. The observations are in accord with the simulated distillations of the products shown in FIG. 3, which demonstrate clearly the superior hydrocracking abilities of the MS-83 system.

Advantages of the present invention include:

(i) That a catalyst consisting of Ru-HY zeolite/NiO-$MoO_3$-$Al_2O_3$ in which Ru loading is about 5% w/w of the zeolite, $NiO_3$ and $MoO_3$ are 5% w/w and 15% w/w of the alumina respectively, and zeolite/alumina ratio is about 1:1 has been developed which is considerably more active for removal of organically-bound nitrogen than the most successful commercial catalyst investigated (Ni-Mo).

(ii) That this catalyst has also displayed a significant increase in hydrocracking ability over the Ni-Mo system.

The described arrangement has been advanced merely by way of explanation and many modifications may be made thereto without departing from the spirit and scope of the invention which includes every novel feature and combination of novel features herein disclosed.

We claim:

1. A catalyst material comprising ruthenium or a ruthenium-containing material or a combination thereof with a zeolite support material and a Group VI or Group VIII metal or a combination thereof with a refractory support material.

2. A catalyst material according to claim 1 in which at least a portion of the sodium content of the zeolite support material has been replaced by ammonium ion or ammonium ion-containing material.

3. A catalyst material according to any preceding claim in which at least a portion of the zeolite support material is in an acidic form.

4. A catalyst material according to claim 2 or 3 in which at least a portion of the ammonium ion of the zeolite support material has been replaced by ruthenium or a ruthenium containing material.

5. A catalyst material according to any preceding claim in which the Group VI or VIII metal is a single metal or salt or combination of metals and/or salts.

6. A catalyst material according to any preceding claim in which the Group VI metal is molybdenum or tungsten or a combination of both and the Group VIII metal is nickel or cobalt or a combination thereof, and is present in the catalyst composition preferably as the oxide.

7. A catalyst material according to any preceding claim in which the ruthenium or ruthenium-containing material has been incorporated into the zeolite support material by cation exchange or by impregnation.

8. A catalyst material according to any preceding claim in which the ruthenium is in the form of a ruthenium metal salt, such as a complex salt selected from the group comprising $[Ru(NH_3)_6]^{3+}$, $[RuCl_3xH_2O]$ and $[Ru(CO)_{12}]$.

9. A catalyst material according to any preceding claim further comprising sulphur or a sulphur containing compound, preferably a ruthenium-sulphur complex.

10. A catalyst material according to any preceding claim in which the refractory support comprises one or more of alumina, titania, zirconia, magnesia, silica, silica-alumina, natural or synthetic clays.

11. A catalyst material according to any preceding claim in which the zeolite support material is a Y-zeolite and the refractory support material is gamma-alumina.

12. A catalyst material according to any preceding claim in which the ruthenium is present in about 0.01 to 20.0% w/w of the zeolite support material, preferably 0.5 to 3% w/w, more preferably 1% w/w.

13. A catalyst material according to any preceding claim in which the ratio of Y-zeolite to gamma-alumina is from 1:9 to 9:1, preferably 1:4 to 4:1, more preferably 1:1.

14. A catalyst material according to any preceding claim in which the ratio of the Group VIII metal to Group VI metal is in the ratio of from 1:1 to 1:5, preferably 1:3.

15. A catalyst material according to any preceding claim in which there is about 2 to 10% by weight of the Group VIII metal based on the weight of refractory support preferably 3 to 8%, more preferably 5%.

16. A catalyst material according to any preceding claim in which the Group VI metal is present in an amount from 5 to 30% by weight based on the weight of the refractory support, preferably 10 to 20% w/w, more preferably about 15% w/w.

17. A catalyst material according to any preceding claim in which the Group VIII metal is nickel present in a nickel oxide and the Group VI metal is molybdenum present as molybdenum oxide, the nickel oxide being in an amount of about 2 to 10%, preferably 5% by weight based on the weight of alumina, and the molybdenum being present in an amount of 10 to 20%, preferably 15% by weight of alumina.

18. A method of making a catalyst material comprising contacting a zeolite material with an ammonium ion-containing material at a temperature between about 10° C. and 200° C. for a time sufficient to form an ammonium ion exchanged zeolite material, contacting the exchanged zeolite material with ruthenium or a ruthenium-containing material in aqueous solution for a time sufficient to form a ruthenium exchanged zeolite material, impregnating a refractory support material with a Group VI or Group VIII metal and contacting the ruthenium exchanged zeolite material with the impregnated refractory support material to form the catalyst material.

19. A method according to claim 18 further comprising contacting the thus formed catalyst material with sulphur or a sulphur containing material to produce a sulphided catalyst material.

20. A method according to claim 19 wherein sulphiding of the catalyst material takes place prior to or simultaneously with use of the catalyst material.

21. A method according to claim 19 or 20 in which the sulphiding of the catalyst is effected by hydrogen sulphide, optionally together with hydrogen.

22. A method according to any one of claims 18 to 21 for preparing a catalyst material of any one of claims 1 to 17.

* * * * *

UNITED STATES PATENT AND TRADEMARK OFFICE
CERTIFICATE OF CORRECTION

PATENT NO. : 4,740,487
DATED : April 26, 1988
INVENTOR(S) : Trevor W. Matheson, et al It is certified that error appears in the above-identified patent and that said Letters Patent is hereby corrected as shown below:

On the title page, item [57]
IN THE ABSTRACT, LINE 4, delete "impregnated".

Signed and Sealed this

Ninth Day of January, 1990

Attest:

JEFFREY M. SAMUELS

Attesting Officer     Acting Commissioner of Patents and Trademarks